3,458,139
**METHOD AND ARRANGEMENT FOR DISINTE-
GRATING BIOLOGICAL MATERIAL UNDER
HIGH PRESSURE**
Lars Bennet Edebo, Uppsala, Sweden, assignor to
Aktiebolaget Biox, Ektorp, Sweden, a corporation
of Sweden
Filed Sept. 19, 1966, Ser. No. 580,487
Claims priority, application Sweden, Sept. 17, 1965,
12,103/65
Int. Cl. B02c *19/12, 1/00, 23/00*
U.S. Cl. 241—1          10 Claims

ABSTRACT OF THE DISCLOSURE

A method and apparatus for disintegrating biological material wherein a frozen sample of the material is positioned within a presure chamber and a first ram applies a high pressure to the material within the chamber so as to liquify at least a part of the material. The pressure chamber has an aperture communicating with a collecting chamber, the aperture being closed by means of a second ram to which a substantial counter pressure is applied. When the pressure imposed by the first ram is sufficient to overcome said counter pressure, the second ram is moved thereby to open the aperture and the material is forced through the aperture into the collecting chamber, the material disintegrating as it passes through the aperture.

---

It is previously known to use high-pressure presses to disintegrate biological material at low temperature, the material being forced through very small apertures. The method is such that the biological material in frozen form, at approximately −25° C. for instance, is forced once or several times through a small aperture, under high pressure of up to approximately 2000 kg./cm.$^2$. A similar method and an arrangement for carrying out the same is described in my article in the Journal of Biochemical and Microbiological Technology and Engineering, vol. 2, No. 4, pages 453–579, issued in 1960.

Development, however, has progressed to such an extent that a more effective disintegration of biological material has become desirable, The fullfillment of this desire necessitates overcoming considerable practical problems and the present invention is intended to resolve these problems.

The method according to the present invention is mainly characterized in that the biological material is forced under counter pressure through one or more apertures.

The present invention also relates to an arrangement for carrying out the method, wherein the arrangement comprises a pressure ram arrangement for compressing the biological material in a pressure chamber, the pressure chamber being provided on one or more walls with a counter pressure ram arrangement, adapted to yield and allow material to enter a collecting chamber when the required pressure has been reached in the pressure chamber.

Figure 1:
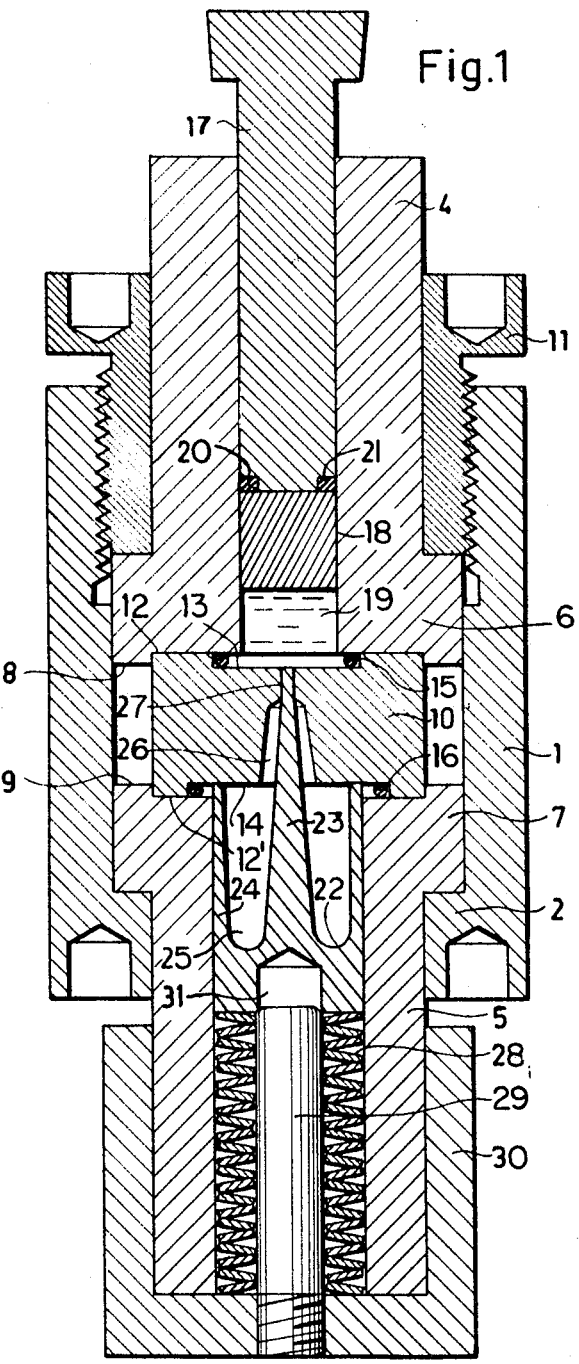

The present invention will be more closely described with reference to accompanying drawings in which FIG. 1 shows a longitudinal section of an arrangement according to the invention and FIG. 2 another embodiment of a detail of the arrangement according to FIG. 1.

The arrangement according to FIG. 1 comprises a retainer portion in the form of a sleeve 1 provided at the lower edge with an inwardly directed flange 2. The sleeve 1 includes two cylinders 4 and 5 provided with flanges 6, 7 respectively. The cylinder 5 is positioned in the sleeve in such away that the flange 7 rests against the flange 2 of the sleeve, the cylinder 4 abutting an intermediate member 10 positioned between the two facing end surfaces 8 and 9 of the cylinders and serving as a cover common to both cylinders. The cylinder 4 is held in position in the sleeve 1 by a ring nut 11 screwed into the sleeve, the said ring nut pressing against the flange 6 of the cylinder 4. As can be seen from the drawing the intermediate member 10 is centered in the sleeve and relative to the cylinders by recesses 12 and 12′ respectively disposed in the end surfaces 8 and 9; recesses 13 and 14 respectively for receiving annular seals 15 and 16 being disposed in corresponding surfaces in the intermediate member 10. By tensioning the ring nut 11 an effective seal is effected between the cylinders and the intermediate member 10 owing to cooperation of the annular seals 15 and 16. The cylinder 4 houses a pressure ram 17 slidably mounted in the cylinder and cooperating at its inner end with an insert piston 18. The insert piston 18, cylinder 4 and recess 13 in the intermediate member 10 together form a pressure chamber 19. Positioned in a groove 20 located at the inner end of the pressure ram 17 is an annular seal 21 of square cross section. When pressure is applied to the pressure ram 17 the annular seal 21 is compressed between the insert piston 18 and the pressure ram 17 and is thus pressed outwards against the inner walls of the cylinder 4 and provides an effective sealing. Arranged in the cylinder 7 is an additional piston 22, in the following called the counter-pressure piston. This piston is axially displaceably mounted in the cylinder 5 and is provided with a centrally projecting portion 23, which together with the jacket portion 24 of the piston forms an annular chamber 25. The upwardly projecting portion 23 of the piston 22 passes freely through a hole 26 in the intermediate member 10 and is guided, in the upper portion of the intermediate portion, through a cylindrical aperture 27, communicating with the hole 26, up into the chamber 19. The upper portion of the upwardly projecting portion 23 of the piston 22 is adapted to lie in the plane with the bottom of the recess 13 in the intermediate member 10 when no load is on said portion 23. The piston 22 is supported by a set of springs comprising spring washers 28 mounted on a central pillar 29 which is rigidly screwed onto a cover 30. The piston 22, opposite the free end of the pillar 29, is provided with a recess 31 so that when the piston is displaced downwards from its position shown in FIG. 1, its movement is not hindered by said pillar.

The arrangement functions in the following manner. It is assumed that the preparation to be disintegrated has been inserted in the pressure chamber 19 of the cylinder 4. The complete arrangement is then cooled down to the required temperature, for instance −25° C. The arrangement is then placed into a high-pressure press which is allowed to act on the pressure ram 17 with the cover 30 held stationary by an abutment surface (not shown). When a pressure of 4,000 kg./cm.$^2$, for instance, has been reached, the frozen mixture in the pressure chamber 19 is converted to a liquid or semi-liquid state and the pressure exerted on the upwardly projecting portion 23 of the piston 22 is so great that the piston 22 moves against the action of the spring washers 28. The biological mass is then forced, while disintegrating, through the hole 27 and 26 in the intermediate member 10 and falls down into the annular chamber 25. When the pressing operation has been completed the arrangement is removed from the press and the preparation in the annular chamber 25 is removed for further examination by removing the cover 30 together with the pillar and set of springs from the cylinder 5, the piston 22 then being allowed to slide out of the cylinder barrel. It is naturally possible to repeat the disintegration procedure by re-inserting the preparation into the pressure chamber 19. It is also obviously possible to dismantle the complete arrangement when the disintegrated preparation is removed.

As can be understood the arrangement according to the invention provides a very simple solution to an otherwise difficult problem. The question is one of causing an organic material to disintegrate under extremely high pressures, which would normally require the arrangement of extremely small inlet apertures for the organic mass. From a practical view point, however, this is difficult to effect with respect to the fact that the structure of the organic mass varies considerably and can easily cause such very small apertures to become blocked. According to the present invention blockage of the hole is effectively prevented by the arrangement of the counter-pressure piston arrangement 22, 23 in the relatively large hole formed for the upwardly projecting portion 23 in the intermediate member 10. The fact that the organic mass passes under said high pressure through a hole of relatively large diameter does not reduce the required effective disintegration of the organic mass.

Figure 2:
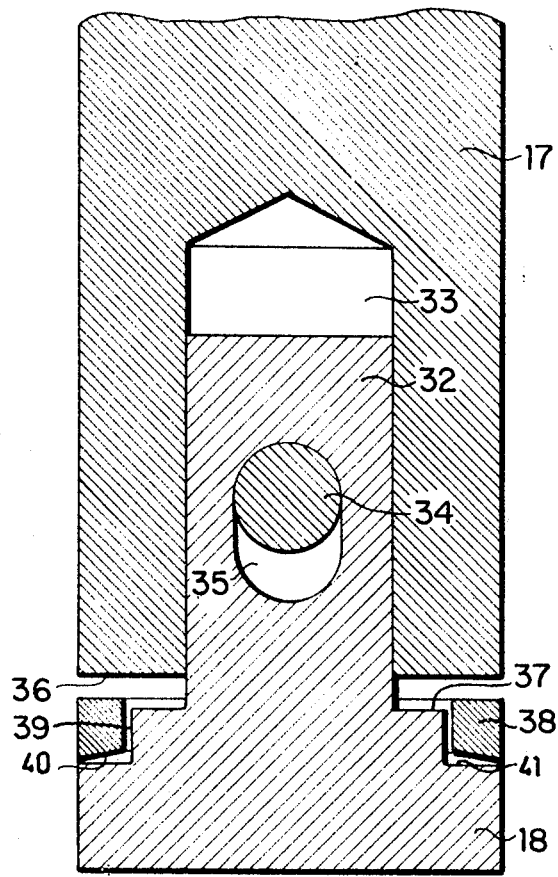

A further embodiment of the pressure ram 17 is shown in FIG. 2. This comprises, as in FIG. 1, a pressure ram portion 17 and an insert piston 18. In this instance the piston 18 is provided with a portion 32 which has been machined down and which is slidably arranged in a hole 33 in the pressure ram 17 and is secured by means of a transversal bolt or pin 34 which by clearance obtained by a slot 35 is connected with the reduced portion 32 so that a certain axial clearance-movement is obtained. Around the outer periphery of the insert piston 18 is an annular seal 38 positioned at the contact surfaces 36, 37 between the two pistons, said seal 38 being located in a groove 39 in the insert piston 18 and being of such cross section that the annular surface 40, seating against the insert piston 18, presents a chamfer and forms an acute angle with the associating groove surface 41. Consequently when the two piston portions are compressed together a natural sliding movement of the annular seal 38 towards the walls of the cylinder 4 is effected. A further advantage of the last mentioned embodiment is that the insert piston 18 can be removed together with the pressure ram 17 when the same is withdrawn. The invention is naturally not restricted to the embodiment shown but other embodiments are also conceivable in which a plurality of counter pressure pistons are arranged in communication with a pressure chamber.

The present invention thus permits biological material to be subjected to a pressure of over 2000 kg./cm.$^2$ at a temperature below 0° C. with the material being disintegrated in a simple and reliable manner.

What is claimed is:

1. A method of disintegrating biological material, comprising the steps of:

positioning a frozen sample of material within a pressure chamber having an outlet aperture in communication with a collecting chamber;

developing a counter pressure in said collecting chamber to prevent movement of said material through said aperture from said pressure chamber into said collecting chamber;

subjecting said sample to a high pressure so as to cause at least a portion of said sample to be converted into a liquid state while maintaining said counter pressure in said collecting chamber to prevent flow of the liquid material through said aperture into said collecting chamber; and increasing said pressure in said pressure chamber to overcome said counter pressure until said material is forced through said aperture into said collecting chamber with said liquid material disintegrating as it flows through said aperture.

2. A method as defined in claim 1, wherein the biological material within said pressure chamber is subjected to a pressure of over 2000 kg./cm.$^2$ and is cooled to a temperature below 0° C.

3. A method as defined in claim 1, wherein the biological material in said pressure chamber is subjected to a pressure of at least 4000 kg./cm.$^2$ and is cooled to a temperature below 0° C.

4. An apparatus for effecting disintegration of biological material, comprising:

housing means defining a pressure chamber and a collecting chamber, said housing means also having an aperture therein connecting and permitting communication between said pressure chamber and said collecting chamber;

ram means movably mounted in said housing means for pressurizing biological material located within said pressure chamber;

movable closure means including a closure member mounted for movement between open and closed positions for closing said aperture, said movable closure means including counter pressure means for maintaining said closure member in said closed position and preventing movement of said material through said aperture until a predetermined pressure is reached in said pressure chamber whereupon said movable closure means opens so as to permit said movement through said aperture into said collecting chamber.

5. An apparatus as defined in claim 4, wherein said closure member comprises a counter pressure ram slideably mounted in said housing and having an end portion for closing said aperture and preventing communication between said pressure chamber and said collecting chamber, said counter pressure ram maintaining said aperture closed and being movable so as to open the aperture and allow movement of material therethrough only when a predetermined pressure has been achieved within said pressure chamber.

6. An apparatus as defined in claim 5, wherein said counter pressure ram comprises a piston slideably mounted in said housing means and having an end portion projecting through the aperture when closing same, said piston further having an annular skirt surrounding said end portion and defining therebetween said collecting chamber.

7. An apparatus as defined in claim 4, wherein said housing means includes first and second cylindrical members having first and second elongated bores, respectively, therein and an intermediate cylindrical member positioned between said first and second cylindrical members with said intermediate cylindrical member having said aperture extending therethrough in communication with said first and second bores, said first and second bores respectively defining said pressure chamber and said collecting chamber, said movable ram means being slideably mounted within said first bore and said closure member being slideably mounted within said second bore and having a projecting portion adapted to cooperate with said aperture for closing same.

8. An apparatus as defined in claim 7, wherein said counter pressure means includes resilient means coacting between said housing means and said slideable closure member for biasing same into a position whereby said projecting portion coacts with said aperture for closing same and for maintaining same closed until said predetermined pressure is developed within said pressure chamber, whereupon said predetermined pressure overcomes the force of said resilient means and causes said closure member to be slideably moved to an open position.

9. An apparatus as defined in claim 7, wherein said movable ram means comprises a first slideable piston member and a second slideable piston member positioned adjacent the end of said first slideable piston member, a sealing ring arranged between said first and second piston members and forced into sliding sealing engagement with the surrounding cylindrical surface of said first bore when pressure is applied by the first piston member to the material within said pressure chamber.

10. An apparatus as defined in claim 9, further including a lost-motion connection means between said first and second piston members for permitting relative movement therebetween, and said sealing ring having a chamfered surface thereon facing said second piston member so that an acute angle is formed between the chamfered surface and the face of the second piston member confronting the first piston member.

References Cited

UNITED STATES PATENTS

| 2,928,614 | 3/1960 | Emanuel et al. | 241—39 |
| 3,165,266 | 1/1965 | Blum et al. | 241—39 X |
| 3,258,209 | 6/1966 | Bennett | 241—1 X |

OTHER REFERENCES

Edebo: Journal of Biochemical and Microbiological Technology and Engineering, vol. 2, No. 4, pp. 463, 464 (1960).

FRANK T. YOST, Primary Examiner

U.S. Cl. X.R.

241—39, 301